April 7, 1942.　　　J. H. WERNIG　　　2,278,627
MOLDING
Filed March 26, 1941

Inventor
James H. Wernig

By Blackmore, Spencer & Hint
Attorneys

Patented Apr. 7, 1942

2,278,627

UNITED STATES PATENT OFFICE 2,278,627

MOLDING

James H. Wernig, Detroit, Mich., assignor to General Motors Corporation, Detroit, Mich., a corporation of Delaware Application March 26, 1941, Serial No. 385,330

2 Claims. (Cl. 189—88)

My invention relates to a molding such as is used in automobile or other building structures.

The principal object of my invention is to make a molding comprising a body and anchoring member which can be quickly and easily assembled.

For a better understanding of the nature and objects of this invention, reference is made to the following specification which describes the preferred embodiment of the invention, and to the accompanying drawing, which illustrates this embodiment.

Fig. 1 of the drawing shows a molding embodying my invention in position at the base of the front seat of an automobile.

Figure 1:
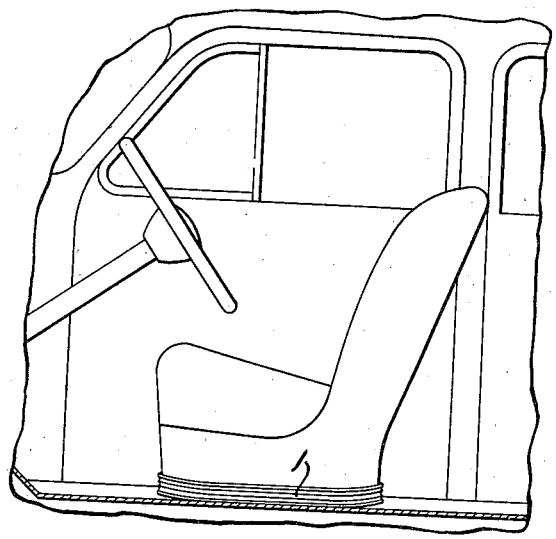
Figure 2:
Fig. 2 shows an enlarged view in elevation of the molding of Fig. 1.
Figure 3:
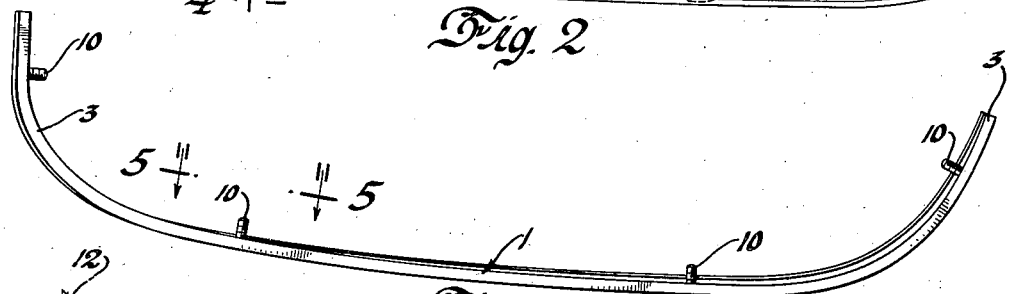
Fig. 3 is a plan view of the molding.

Referring to Figs. 1 to 3, I designates the body of a molding. This body may be of pressed sheet metal or other material; I prefer to make it of stainless steel with longitudinal flutes or corrugations as shown at 2 for ornamentation. The body is flanged as indicated at 3. The edges of these flanges are bent back upon the main body, as at 3a. Together with the flanges 3 and the main body of the molding, these inwardly turned portions 3a form opposed channels 5.

The body of my molding is held in place or anchored at spaced intervals by anchoring members designated generally by 4. The over-all dimensions of this member and the shape of the ends are such that the member may be readily fitted between the opposite flanges 3 of the molding. The contour of the intermediate portion is obviously of minor importance but, for convenience and economy in manufacture, it may be made, as shown, in the form of an elongated strip or plate, flanged, as at 6, at each end. The width of the intermediate portion should, of course, be sufficiently less than the length of the member to enable the member to be inserted between the inwardly turned portions 3a. It may be made of any suitable material which lends itself readily to the manufacturing processes required. The flanges 6 serve to space the member 4 from the corrugated or fluted body I.

Figure 5:
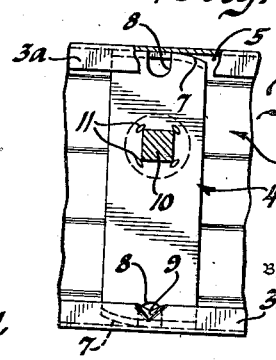
Fig. 5 is an enlarged fragmentary view in elevation of the body and its anchoring member looking from the direction of line 5—5 of Fig. 3.

As best seen in Fig. 5, the anchoring member 4 has at least one corner and preferably at least one pair of diagonally opposite corners relieved or rounded as shown at 7. The purpose of rounding or relieving these corners is to facilitate assembly of member 4 crosswise of the body I with the ends of the member 4 in the channels 5. Referring to Fig. 5, it will be seen that, when rounded, these corners have, for best operation, a radius of curvature not greater than half the distance between the opposed flanges 3 of the body I in order to permit the anchor member to be turned or rocked into position without springing the flanges 3 apart.

The curve or curves should preferably be drawn from such center or centers that the distance between the curved portions of the flanges 7 will not be greater than the distance between flanges 3 of the molding. It will be obvious also that the exactness of the curvature required will depend to a considerable extent upon the size and rigidity of the parts. When used in connection with narrow and flexible molding, for example, the relieving of the corners of the anchor member may be accomplished by approximation to a curved contour, as by one or more beveled areas.

It will, of course, be understood that all four corners may be rounded or relieved if desired. It will also be understood that, if a strip or plate such as is illustrated is used, it will be possible to turn this strip into place with only one corner being rounded. In this case the center of the arc will preferably coincide with the point on the diagonally opposite square corner and the radius of the arc will be equal to the distance between the two flanges 3.

Figure 6:
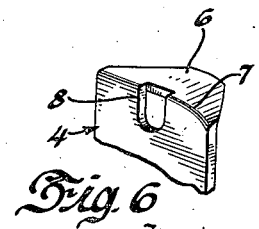
Fig. 6 is an enlarged view of one end of the anchoring member.

Referring to Figs. 5 and 6, anchoring member 4 is provided with a hole or recess 8 near each end. After the member 4 is turned into the position shown in Fig. 5, the inwardly turned portions 3a of the channels 5 are staked or punched into the recesses 8 as indicated at 9 of Figs. 4 and 5.

In its preferred form my molding is assembled as follows: the elongated strip or anchor member 4 is placed in the channeled body I so that the longitudinal axes of the strip and molding form something less than a right angle, with the ends of member 4 lying in the channels 5. The strip 4 is then turned clockwise as seen in Fig. 5 until the longitudinal axes of body I and member 4 form substantially a right angle. In this position the inwardly turned portions 3a are staked or punched into the recesses 8 of member 4, holding the member 4 and the molding 1 in permanently assembled relation. The assembled molding is then ready to be applied to any appropriate structure for which moldings are commonly used.

Figure 4:
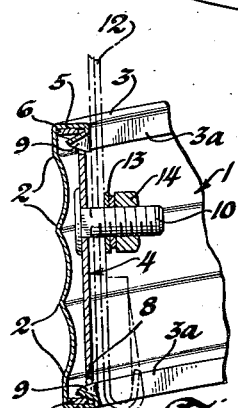
Fig. 4 is a cross section on the line 4—4 of Fig. 2 presenting an enlarged view of the body of the molding and its anchoring member.

As best shown in Fig. 4, means are provided for fastening the member 4 to the structure of which the assembled molding becomes a part. In this case the fastening means comprises a stud 10 welded or staked in position as at 11 (Fig. 5). This stud 10 projects through a wall or bracket 12 to which the molding is fastened. Suitable washers 13 are then placed on the stud and the molding assembly is held in position by the nut 14. It will be understood that any other satisfactory means of fastening the stud 10 to member 4 may be used. It should likewise be understood that any other suitable fastening means may be used, for example, instead of using a stud I may use merely a threaded hole in the member 4.

Although I have shown my invention in its preferred embodiment, it will be understood that modifications thereof may be made and I aim to define the true scope of my invention in the appended claims.

I claim:

1. An elongated member having its two long edges bent back upon themselves to form opposed substantially rectangular channels, an anchoring strip disposed substantially crosswise of said elongated member with its ends in said channels, a threaded member permanently secured to the anchoring strip, means on the strip ends to space the strip against one side of the channels, recesses near the strip ends, and punched-out portions on the channel sides against which the strip is held by said spacer means, said punched-out portions cooperating with said recesses to hold the strip and elongated member in permanently assembled relation.

2. In combination, a structural element having its long edges bent back upon themselves to form opposed substantially rectangular channels, an anchoring strip disposed substantially crosswise of said element with its ends in said channels, a flange at each end of said strip to space the strip against one side of the channels, a recess near each end of the strip, and punched-out portions in the channel sides against which the strip is held by its flanged ends, said punched-out portions cooperating with said recesses to hold the strip and element in permanently assembled relation.

JAMES H. WERNIG.